United States Patent
Fukuoka et al.

(10) Patent No.: US 12,504,038 B2
(45) Date of Patent: Dec. 23, 2025

(54) CABLE ADJUSTER

(71) Applicants: TOYOTA BOSHOKU KABUSHIKI KAISHA, Aichi-ken (JP); HI-LEX CORPORATION, Hyogo (JP)

(72) Inventors: Tatsuya Fukuoka, Toyota (JP); Kenji Usuki, Kawanishi (JP); Teruyuki Hadatsuki, Miyoshi (JP); Takayoshi Hobo, Nagoya (JP); Tomoyoshi Okada, Sanda (JP); Shingo Takeuchi, Toyonaka (JP)

(73) Assignees: TOYOTA BOSHOKU KABUSHIKI KAISHA, Aichi-ken (JP); HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/888,686

(22) Filed: Sep. 18, 2024

(65) Prior Publication Data
US 2025/0137482 A1  May 1, 2025

(30) Foreign Application Priority Data

Sep. 28, 2023 (JP) .................. 2023-167269

(51) Int. Cl.
*F16C 1/10* (2006.01)
*F16C 1/22* (2006.01)

(52) U.S. Cl.
CPC .............. *F16C 1/101* (2013.01); *F16C 1/223* (2013.01); *F16C 1/226* (2013.01)

(58) Field of Classification Search
CPC .......... F16C 1/101; F16C 1/102; F16C 1/103; F16C 1/106; F16C 1/16; F16C 1/22; F16C 1/223; F16C 1/226; B60N 2/90; B60N 2/929; F16B 2/20
See application file for complete search history.

(56) References Cited

U.S. PATENT DOCUMENTS

| | | | |
|---|---|---|---|
| 5,732,601 A * | 3/1998 | Wu ........................ | F16C 1/101 188/24.11 |
| 7,350,870 B2 * | 4/2008 | Bates ..................... | B60N 2/919 297/463.1 |

(Continued)

FOREIGN PATENT DOCUMENTS

| | | | | |
|---|---|---|---|---|
| DE | 102006037363 B3 * | 2/2008 | .............. | F16C 1/101 |
| GB | 197388 A * | 5/1923 | .............. | F16C 1/106 |

(Continued)

*Primary Examiner* — Adam D Rogers
(74) *Attorney, Agent, or Firm* — Greenblum & Bernstein, P.L.C.

(57) ABSTRACT

A cable adjuster has a main case, an outer casing fixing member, a number of sliders, and a locking member. The main case is configured to insert the inner cable in the cable axial direction. The outer casing fixing member affixes to an end of a pre-branch outer casing, which is the tube section of the outer casing before branching, to the main case. The sliders are arranged in parallel in the slots formed in the main case so as to slide in the cable axial direction. The sliders affixes to the ends of a plurality of post-branch outer casings, which are the post-branch tube sections of the outer casing. The locking member locks the sliding movement of the sliders with respect to the main case in the cable axial direction.

16 Claims, 8 Drawing Sheets

(56) References Cited

U.S. PATENT DOCUMENTS

| | | | |
|---|---|---|---|
| 8,857,288 B2 * | 10/2014 | Sano | F16C 1/101 |
| | | | 74/502.4 |
| 10,234,060 B1 * | 3/2019 | Ficyk | F16C 1/26 |
| 10,323,680 B2 * | 6/2019 | Carabalona | F16C 1/101 |
| 11,149,781 B2 * | 10/2021 | Gordon | F16C 1/20 |
| 11,486,168 B2 * | 11/2022 | Oyama | E05B 79/20 |
| 11,859,655 B2 * | 1/2024 | Kuribayashi | F16C 1/101 |
| 12,044,269 B2 * | 7/2024 | Funahashi | H02G 15/113 |
| 12,234,859 B2 * | 2/2025 | Okada | F16C 1/22 |
| 12,331,778 B2 * | 6/2025 | Imagawa | F16C 1/22 |
| 2022/0260108 A1 | 8/2022 | Okada et al. | |
| 2023/0366427 A1 * | 11/2023 | Tokimasa | F16C 1/106 |
| 2025/0043815 A1 * | 2/2025 | Takeuchi | F16C 1/101 |

FOREIGN PATENT DOCUMENTS

| | | | | |
|---|---|---|---|---|
| JP | H08277830 A | * | 10/1996 | |
| JP | 2001050241 A | * | 2/2001 | F16C 1/106 |
| JP | 2021-32333 | | 3/2021 | |

\* cited by examiner

CABLE ADJUSTER

CROSS-REFERENCE TO RELATED APPLICATION

This application claims priority to Japanese patent application serial number 2023-167269, filed Sep. 28, 2023, the content of which is incorporated herein by reference in its entirety for all purposes.

TECHNICAL FIELD

The present disclosure relates to a cable adjuster. In particular, the present disclosure relates to a cable adjuster for adjusting the length of a tubular outer casing into which an inner cable is inserted.

BACKGROUND

For example, a prior art discloses a cable adjuster for adjusting the length of a tubular outer casing which guides the routing path of an inner cable. There are two separated outer casings with the cable adjuster disposed between them. The cable adjuster has a cylindrical main case which allows the inner cable to be inserted in the cable axial direction. The cable adjuster also has an outer casing fixing member. The outer casing fixing member fixes the end of one of the two separated outer casings to the main case.

The cable adjuster also has a slider. The slider is disposed in a slot formed in the main case slidably in the cable axial direction. The slider fixes the end of the other outer casing. The cable adjuster further has a locking member capable of locking the sliding movement of the slider with respect to the main case. When the cable is routed, one end and the other end of the outer casing are fixed to the object to which the outer casing is routed.

According to the above configuration, when the end of the inner cable pulled out from the outer casing is pulled out from its initial position in order to connect the inner cable to an object to be operated, the slider slides with respect to the main case. Specifically, when the inner cable is pulled out from the outer casing, a guide length required for the outer casing is shortened by the length of pulling.

Therefore, in order to adjust the length of the outer casing to the guide length, the slider slides in the direction of being pushed in against the main case due to the reaction force from the pullout of the inner cable. When the slider is slid to the position where the length of the outer cable meets the guide length, the slider is locked by a locking member. By virtue of the cable adjuster, the length of the outer casing is adjusted to the appropriate guide length that does not cause play due to excess length in the inner cable.

According to the configuration described in the above prior art, when the inner cable is branched in the middle, the cable adjuster must be provided for each branched tube section of the corresponding outer casing. Therefore, the configuration becomes complicated. The present disclosure provides a cable adjuster which is reasonably adjust each of the outer casings to an appropriate guide length even if the outer casing is branched into multiple sections.

SUMMARY OF THE DISCLOSURES

According to one aspect of the present disclosure, a cable adjuster which adjusts the length of a tubular outer casing into which an inner cable is inserted. The cable adjuster has a main case, an outer casing fixing member, a plurality of sliders, and a locking member. The main case is configured to insert the inner cable in the cable axial direction. The outer casing fixing member fixes the end of a pre-branch outer casing, which is the tube section of the outer casing before branching, to the main case. The sliders are arranged in parallel in the slots formed in the main case so as to slide in the cable axial direction. The sliders fix the ends of a plurality of post-branch outer casing, which are the post-branch tube sections of the outer casing. The locking member locks the sliding movement of the sliders in the cable axial direction with respect to the main case.

DETAILED DESCRIPTION

Referring to FIGS. 1 to 8, an embodiment for carrying out the present disclosure will be described.

First, the configuration of a cable adjuster 1 according to an embodiment of the present disclosure will be explained with reference to FIGS. 1 to 8. In the following explanations, when the directions such as front/rear, up/down, right/left, etc. are indicated, they refer to the respective directions indicated in the respective figures. When specific reference figures are not shown, or when there is no corresponding number in a reference figure, one of the figures from FIGS. 1 to 8 shall be referred to as appropriate.

Figure 1:
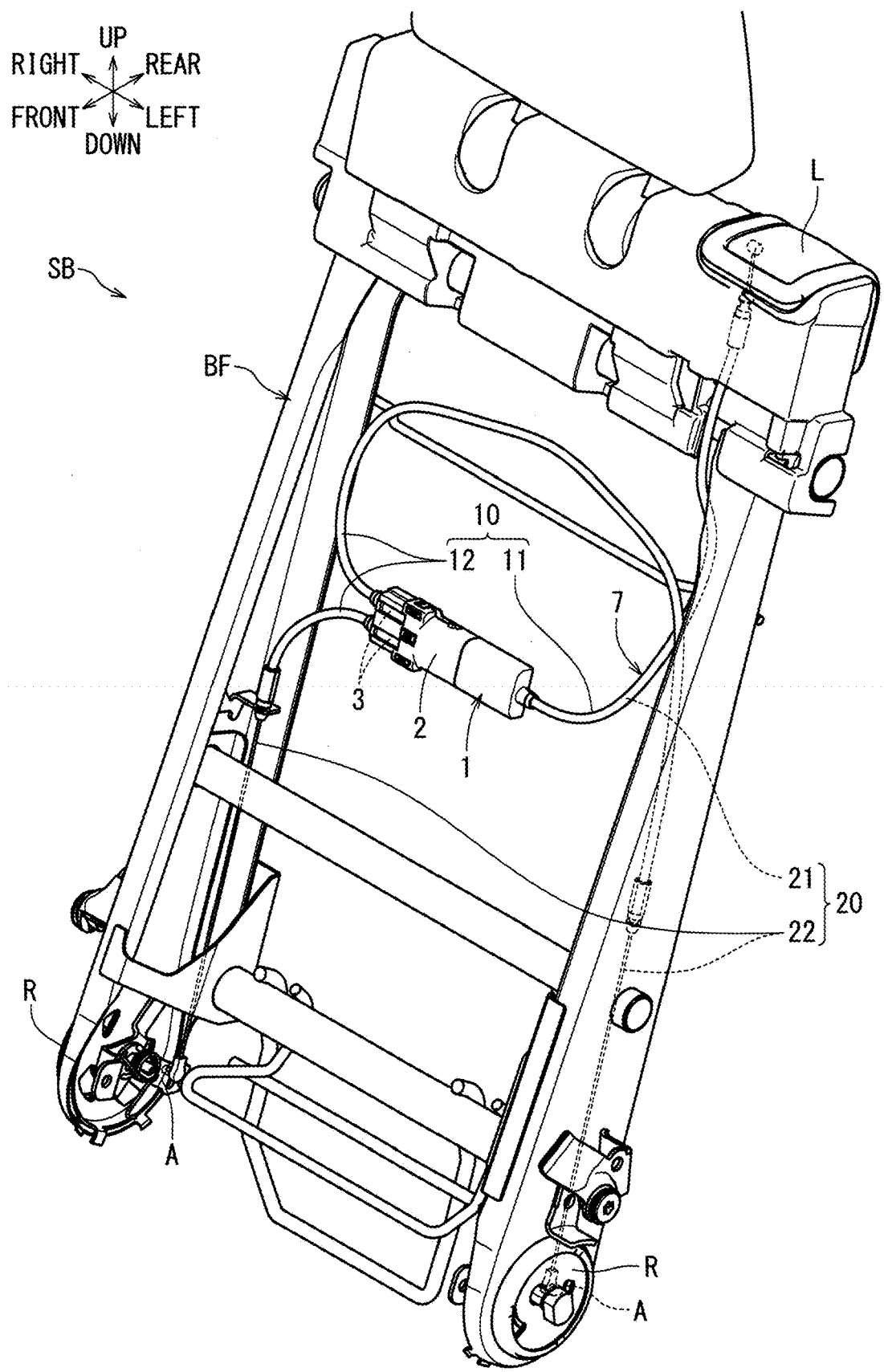
FIG. 1 is a perspective view of a configuration diagram of a cable adjuster according to an embodiment.

As shown in FIG. 1, the cable adjuster 1 is an adjuster for adjusting the length of an outer casing 10 of an operation cable 7 which is routed to a seat back SB of an automobile seat. The seat back SB has a back frame BF as a framework. The back frame BF has a frame shape viewed from the front.

The back frame BF is connected to the framework of a seat cushion (not shown) via a recliner R, which is a step-type angle adjustment mechanism, at the lower ends of the right and left sides of the back frame BF, respectively. Thereby, the seat back SB is able to adjust the angle of back recline with respect to the seat cushion.

Each of the recliners R is usually held in a locked state in which the back recline angle of the seat back SB is fixed by spring force. When a user pulls up an operation lever L provided on the left shoulder of the back frame BF, the recliners R are simultaneously released from their respective locked states.

The seat back SB is switched to a state in which its back recline angle can be changed in the front/rear direction. Each of the recliners R is returned to the locked state by the spring force again when the operation of the operation lever L is returned. Between the operation lever L and each of the recliners R, an operation cable 7 is connected to transmit the operation force by the operation lever L to each of the recliners R.

The operation cable 7 is a pull cable comprising the outer casing 10, which serves as a tubular cable guide, and an inner cable 20, which is passed inside the outer casing 10. The operation cable 7 has a two-part split in its path on the operated-side (lower side in FIG. 1) via the cable adjuster 1 disposed in the middle of the routing path. A release arm A is connected to the right-side recliner R and the left-side recliner R, respectively. The operation cable 7 connects to the release arm A at the end of the diverged path on the operated side.

As the operation cable 7 transmits the operation force to each release arm A on the operated-side as a tensile operation force when the operation lever L is pulled up, each release arm A operates to release the lock state of each recliner R simultaneously.

The operation cable 7 is routed so that the outer casing 10 serves as a cable guide and affixes to the back frame BF as follows. The end of the outer casing 10 on the operation-side (upper side in FIG. 1) and each of the branched ends of the outer casing 10 on the operated-side (lower side in FIG. 1) affix to the back frame BF.

The outer casing 10 is routed in a curved form between the end of the operation-side and each end of the operated-side. The inner cable 20 passes through the outer casing 10 with a routing path for properly connecting the inner cable 20 to the operation lever L and each release arm A. The outer casing 10 does not affix to the back frame BF at any point other than at the end of the operation-side and at each end of the operated-side.

The outer casing 10 is divided into three parts via the cable adjuster 1 provided in the middle of the routing path: a pre-branch outer casing 11, which is the operation-side path (a casing before branching), and two post-branch outer casings 12, which are the operated-side path (a casing after branching). The pre-branch outer casing 11 and two post-branch outer casings are connected via the cable adjuster 1 so that they are integral with each other.

The connecting end of the pre-branch outer casing 11 affixes to the cable adjuster 1. Each connecting end of the two post-branch outer casings 12 affixes to the cable adjuster 1 after appropriately adjusting the length (guide length) after routing.

The operation cable 7 is routed so that the inner cable 20 passes inside the outer casing 10 and connects to the operation lever L and each release arm A, respectively. Like the outer casing 10, the inner cable 20 is divided into three parts via the cable adjuster 1 provided in the middle of the routing path: a pre-branch inner cable 21, which is the operation-side path (a cable before branching), and two post-branch inner cables 22, which are the operated-side path (a cable after branching).

The pre-branch inner cable 21 passes inside the pre-branch outer casing 11. The end of the pre-branch inner cable 21 pulled out from the end of operation-side of the pre-branch outer casing 11 is integrally fixed to the operation lever L.

The two post-branch inner cables 22 pass inside the corresponding post-branch outer casing 12. The ends of the two post-branch inner cables 22 pulled out from the end of the operated-side of the post-branch outer casing 12 affix to the corresponding release arm A, respectively. The connecting end of the pre-branch inner cable 21 on the side to be passed through the cable adjuster 1 and the connecting end of each post-branch inner cable 22 on the side to be passed through the cable adjuster 1 are integrally connected to each other inside the cable adjuster 1.

When the operation lever L is pulled up, the end of the operation-side of the inner cable 20 of the operation cable 7 is pulled out from the outer casing 10. Therefore, each end of the operated-side of the inner cable 20 connected to each release arm A of the operation cable 7 is pulled into the outer casings 10, pulling up each release arm A, respectively.

The operation cable 7 splits in two in the middle of the routing path. Each of the post-branch operation cables 7 connects to the corresponding release arm A through a route that is different from each other. Therefore, the length of the routing path of the operation cable 7 tends to differ between one of the post-branch cables and the other.

It is desirable that one of the post-branch operation cables 7 and the other thereof are connected to the corresponding release arm A in such a manner that no play is created due to excess length. If there is play, the release response of each of the respective recliner R to the operation of the operation lever L will be slow, resulting in a poor feeling of operation. If the play is uneven on both cables, there will be a gap in the release timing of each recliner R, which will cause problems in the release operation.

If there is no play, even if there is a difference in the length of the routing path between one and the other post-branch operation cable 7, they can be operated simultaneously. Therefore, in order to shorten such play, the cable adjuster 1 is configured so that the length of each post-branch outer casing 12 extending out from the cable adjuster 1, i.e., the guide length guiding each post-branch inner cable 22, can be adjusted to an individually suitable length.

Figure 2:
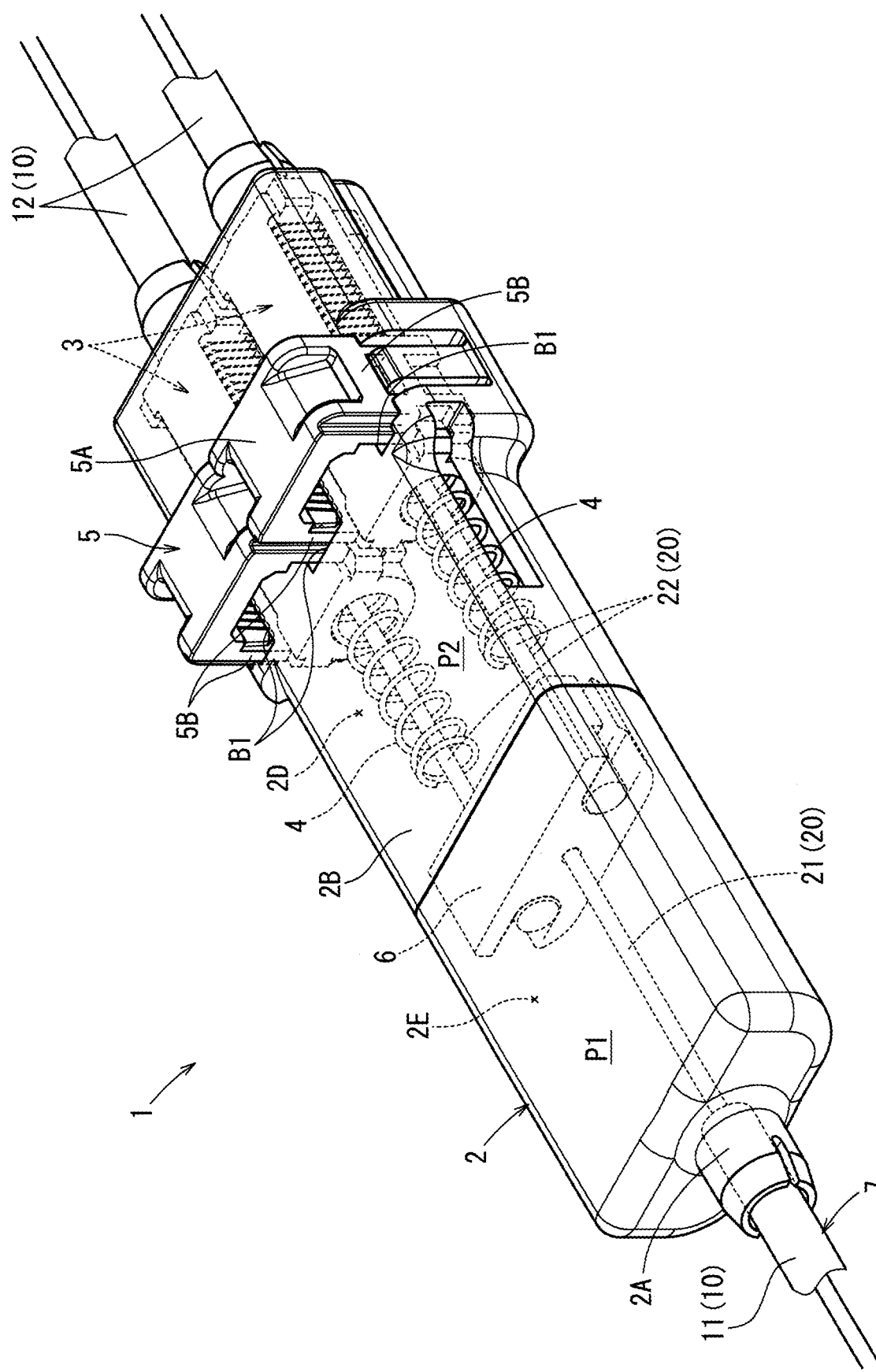
FIG. 2 is an enlarged perspective view of the cable adjuster.
Figure 3:
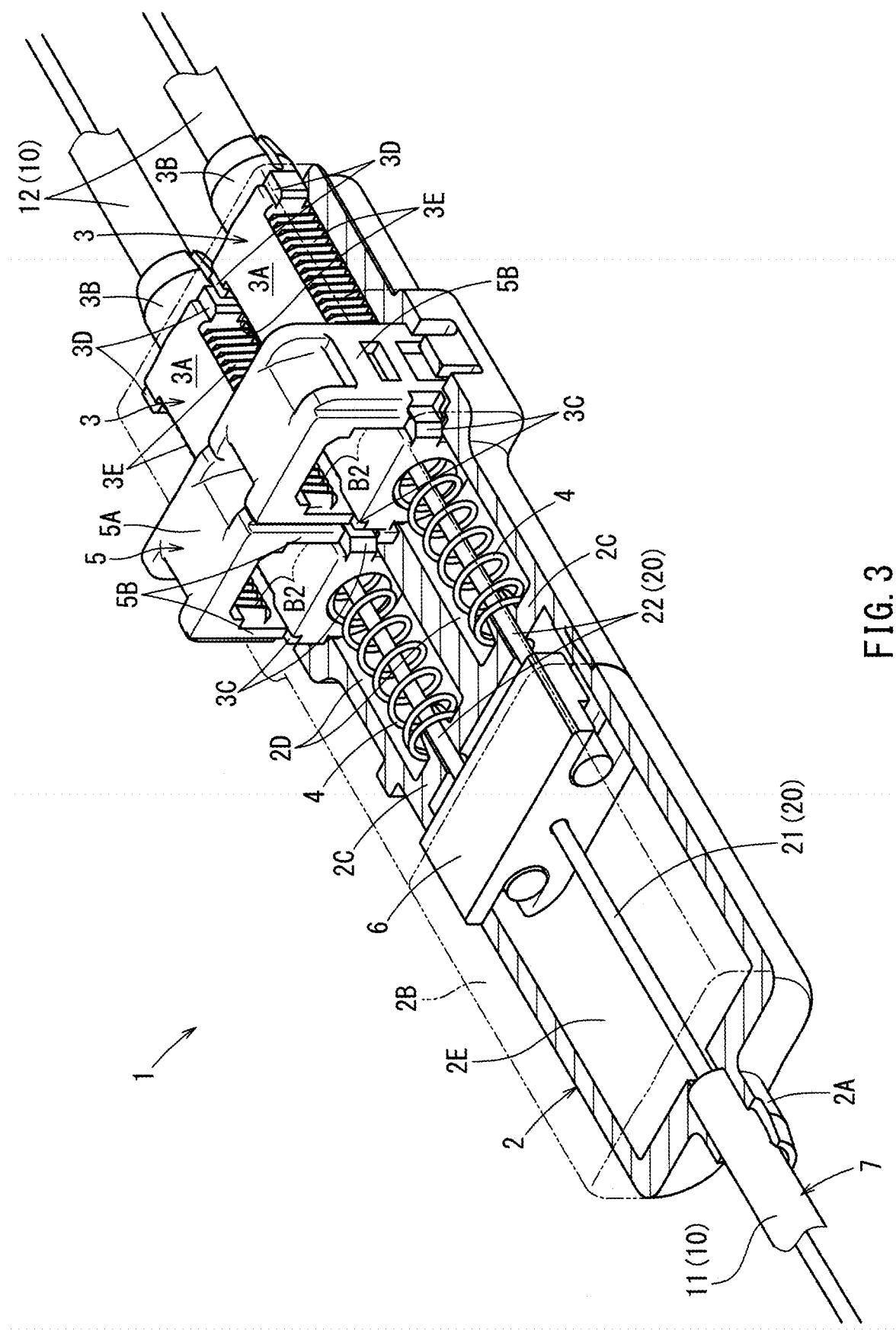
FIG. 3 is a perspective view of a partial cross-sectional view of a main case showing inside thereof.
Figure 4:
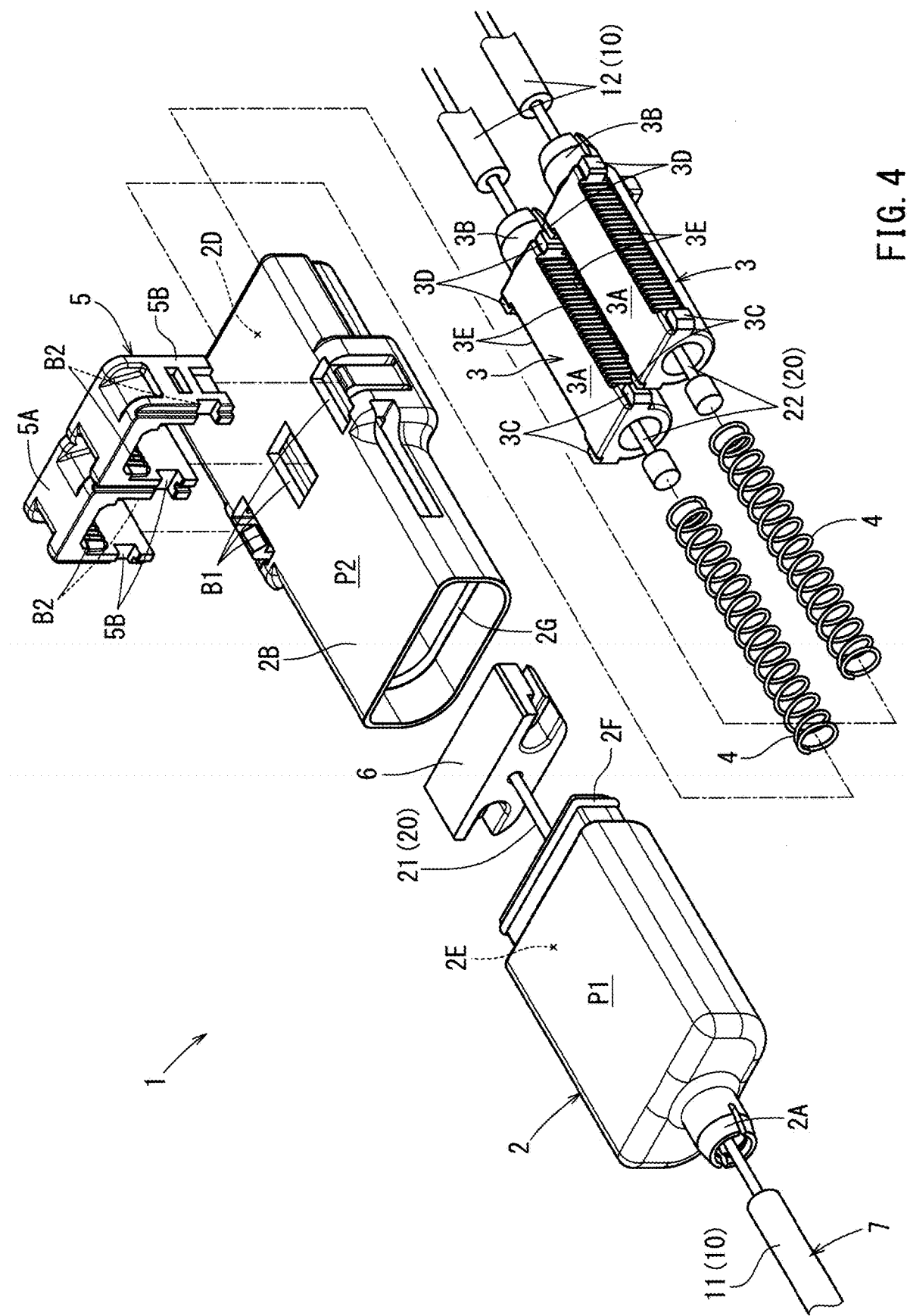
FIG. 4 is an exploded perspective view of the main case.

The specific configuration of the cable adjuster 1 will be described in detail below. As shown in FIGS. 2 to 4, the cable adjuster 1 includes a main case 2, two sliders 3, two compression coil springs 4, a locking member 5, and an inner cable connecting member 6.

The main case 2 is a flat cylindrical member that is long in the cable axis direction. As shown in FIG. 4, the main case 2 comprises two cylindrical split pieces P1 and P2, which are divided in the cable axial direction. The main case 2 is assembled into one cylindrical shape by mating the split pieces P1 and P2 so that they are integrated with each other in the cable axial direction. Specifically, an annular projection 2F, which protrudes in an annular shape, is formed on the outer circumference of the cylinder of the split piece P1. The split piece P1 is the convex side of the assembly. An annular groove 2G is formed on the inner circumference of the cylinder of the split piece P2. The split piece P2 is the concave side of the assembly. By fitting the annular projection 2F into the annular groove 2G, the split pieces P1 and P2 are fitted together as one.

As shown in FIGS. 2 and 3, the main case 2 is shaped with the cylinder end closed at the front side as shown in figures. An outer casing fixing member 2A, which protrudes cylindrically toward the front side as shown in FIG. 2 (in the cable axial direction), is integrally formed in the center of the closed end of the main case 2. The outer casing fixing member 2A penetrates the main case 2 in the cable axial direction so that the inside of the outer casing fixing member 2A is connected to the inside of the main case 2.

The connecting end of the pre-branch outer casing 11 is inserted from the front side as shown in FIG. 2 in the cable axis direction. The connecting end of the pre-branch outer casing 11 is integrally fixed to the outer casing fixing member 2A. Thereby, the connecting end of the pre-branch inner cable 21 is inserted into the cylinder of the main case 2.

As shown in FIGS. 2 and 4, a top plate 2B, which is the upper wall of the main case 2, is a flat plate extending flatly in the cable axis direction and in the horizontal direction. The top plate 2B has three inlet ports B1, which are rectangular hole-shaped, in a horizontal alignment. The inlet ports B1 are shaped so as to be connected to the inside of the main case 2. Three leg portions 5B, which are formed in the locking member 5 described below, are inserted into the three inlet ports B1 from the upper side as shown in FIG. 4.

As shown in FIG. 3, two compression coil springs 4 and two sliders 3 are inserted into the main case 2 in this order from the rear side. They are arranged in parallel. The main case 2 has a spring seat 2C which supports the compression coil spring 4 inserted into the cylinder.

A slot 2D is formed inside the main case 2. Each slider 3 is inserted into the slot 2D of the main case 2. The slots 2D allow each slider 3 to be inserted from the rear side of the slots 2D in the FIG. 3 so that the slider 3 can slide in the cable axial direction. Then, the locking member 5 is inserted into the main case 2. Since each leg portion 5B of the locking member 5 are engaged with the slider 3, it is prevented the slider 3 from being pulled out of the main case 2 toward the rear side.

As shown in FIGS. 3 and 4, the slider 3 is a cylindrical member extending in the cable axial direction. The slider 3 has a cylindrical sliding portion 3A which is inserted into the slot 2D formed inside of the main case 2. The sliding portion 3A is supported so that they can only slide in the cable axial direction with respect to the main case 2 by being inserted into the slot 2D of the main case 2.

Specifically, the upper surface of the sliding portion 3A is formed in a flat surface shape. By inserting the sliding portion 3A into the slot 2D of the main case 2, the sliding portion 3A is set so that the upper surface comes into surface contact with the inner peripheral surface of the top plate 2B of the main case 2. Thereby, the sliding portion 3A is set in a state in which rotation around the cable axis is restricted so that the sliding portion 3A can only slide along the inner peripheral surface of the top plate 2B of the main case 2 in the cable axial direction.

By inserting each sliding portion 3A into the slots 2D of the main case 2, the lateral movement, which is the direction in which each sliding portion 3A and the slots 2D are aligned, is also regulated. Specifically, the slot 2D of the main case 2 has a bottom surface that is curved in a wavy shape. Therefore, the bottom surface of the slot 2D is individually in surface contact with the bottom surface of each sliding portion 3A, which are curved around the cable axis. Thereby, the slot 2D in the main case 2 restricts the lateral movement of each sliding portion 3A.

A fixed portion 3B is integrally formed on the slider 3. The fixed portion 3B projects cylindrically in the cable axial direction from the center of the rear end of the sliding portion 3A. The inside of the fixed portion 3B is shaped to penetrate in the cable axial direction so as to be connected with the inside of the corresponding sliding portion 3A.

The connecting end of the corresponding post-branch outer casing 12 is inserted into the fixed portion 3B of each slider 3 in the cable axial direction from the rear side. Then, the post-branch outer casing 12 is integrally fixed to the fixed portion 3B. Thereby, the connecting end of the post-branch inner cable 22, which is pulled out from the connecting end of the post-branch outer casing 12, is pulled out through each slider 3 to the front side.

As shown in FIG. 3, after fixing the post-branch outer casings 12 corresponding to each slider 3, each slider 3 is inserted into the slots 2D of the main case 2. The connecting ends of the corresponding post-branch inner cables 22 extending from each slider 3 toward the front side are also inserted into the main case 2.

As shown in FIG. 4, each slider 3 has a first projection 3C projecting in both lateral directions from the front end of the sliding portion 3A. In addition, each slider 3 has a second projection 3D projecting in both lateral directions from the back end of the sliding portion 3A.

As shown in FIG. 3, each slider 3 is inserted into the slot 2D of the main case 2, and then the locking member 5 is inserted into the main case 2 from above. Three leg portions 5B of the locking member 5 are inserted between the first projection 3C and the second projection 3D of the slider 3. Each slider 3 can slide individually in the cable axial direction with respect to the main case 2 only within the range between the first projection 3C and the second projection 3D touching the leg portion 5B of the locking member 5.

Each slider 3 has an engaged portion 3E between the first projection 3C and the second projection 3D on both side surfaces of the sliding portion 3A, respectively. The engaged portion 3E has a plurality of teeth arranged in a sawtooth shape in the cable axial direction. The engaged portion 3E is an engaging portion with which each engagement teeth B2 formed on the inner surface of the corresponding leg portion 5B of the locking member 5 is engaged when the locking member 5 is pushed further from the inserted position shown in FIG. 3 (see FIG. 8).

The sliding of each slider 3 with respect to the main case 2 is locked collectively. The operation of engaging the locking member 5 will be described in detail later with reference to FIG. 8. As shown in FIG. 3, each slider 3 is subjected to the action of a spring biasing force by two compression coil springs 4, which individually pushes each slider 3 back against the main case 2. The two compression coil springs 4 are inserted into the cylinder of the main case 2 prior to each slider 3.

After each slider 3 is inserted, the locking member 5 is inserted into the main case 2 from above. The first projection 3C is placed against the corresponding leg portion 5B of the locking member 5, and each slider 3 is prevented from slipping out. By pushing each slider 3 toward the front side against the spring force, the sliders 3 can individually slide up to a position where the second projection 3D comes into contact with the corresponding leg portion 5B of the locking member 5.

As shown in FIG. 4, the locking member 5 has a pressing portion 5A and the leg portions 5B integrally. The pressing portion 5A is a top plate portion in the form of a horizontal flat plate. The leg portion 5B is a vertical plate portion hanging down from the three portions of the pressing portion 5A. As shown in FIG. 3, the locking member 5 is assembled to the top plate 2B of the main case 2 so that the corresponding leg portion 5B is inserted from above into each inlet port B1 formed in the top plate 2B of the main case 2.

The locking member 5 is inserted into the main case 2 via the inlet port B1 to which each leg portion 5B corresponds. Each leg portion 5B is inserted between the first projection 3C and the second projection 3D projecting from each corresponding side surface of the slider 3 inserted into the slot 2D of the main case 2.

Specifically, by inserting the locking member 5 into the main case 2, the tips of the leg portions 5B are weakly snap-fitted and locked into the main case 2 at a shallow insertion position where they fit between the first projection 3C and the second projection 3D shown in FIG. 3. When the user presses the pressing portion 5A from the above insertion position toward the top plate 2B of the main case 2, the leg portions 5B of the locking member 5 are further inserted into the main case 2 against the above snap-fitting force.

Figure 8:
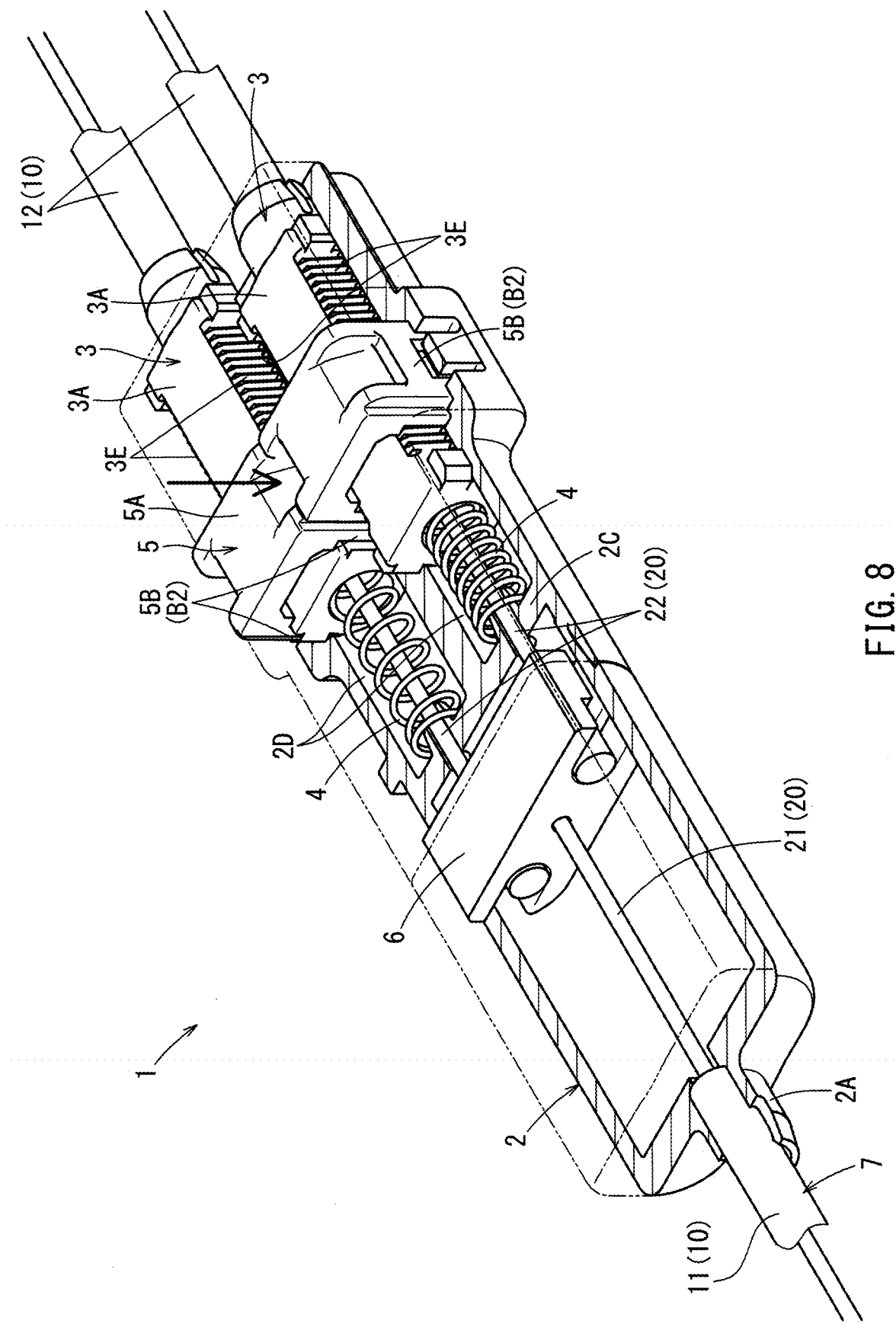
FIG. 8 is a perspective view of a partial cross-sectional view of the cable adjuster with locked by a locking member.

As shown in FIG. 8, the corresponding engagement teeth B2 formed on the inner side of the leg portion 5B of the locking member 5 simultaneously engage the engaged portion 3E formed on the side surface of the slider 3. As shown in FIG. 4, similar to the engaged portion 3E formed on the slider 3, the engagement teeth B2 of the locking member 5 have a tooth shape in which a plurality of teeth is arranged in a sawtooth shape in the cable axial direction.

Regardless of the position of the slider 3 in the movable range, the engagement teeth B2 of the locking member 5 can be pressed into engagement with the engaged portion 3E by pressing the pressing portion 5A. As shown in FIG. 8, even when the sliders 3 are in different sliding positions, the engagement teeth B2 of the locking member 5 can be engaged with the engaged portion 3E of each slider 3. Accordingly, the sliding of each slider 3 with respect to the main case 2 can be locked simultaneously at any individual sliding position.

As shown in FIG. 4, an accommodating portion 2E is the inside of the cylinder of the part where the split pieces P1, P2 of the main case 2 are fitted together. The inner cable connecting member 6 is a horizontally elongated member which is able to be accommodated in the accommodating portion 2E. Before the split pieces P1, P2 of the main case 2 are fitted together, the inner cable connecting member 6 is used to integrally hook a connecting end of the pre-branch inner cable 21 that is passed through the split piece P1 from the operating side and connecting ends of the post-branch inner cables 22 that is passed through the split piece P2 from the operated side.

Thereafter, the split pieces P1, P2 are fitted together so as to accommodate the inner cable connecting member 6 in the main case 2. the connecting end of the pre-branch inner cable 21 and the connecting ends of the post-branch inner cables 22 connect to each other via the inner cable connecting member 6 in the accommodating portion 2E of the main case 2. The inner cable connecting member 6 is accommodated in the accommodating portion 2E from between the split pieces P1 and P2 of the main case 2. Therefore, compared to a configuration that does not include such a configuration, the inner cable connecting member 6 can be easily assembled into the main case 2. Also, the connecting ends of the pre-branch inner cable 21 and each post-branch inner cable 22 can be easily connected to the inner cable connecting member 6.

Figure 5:
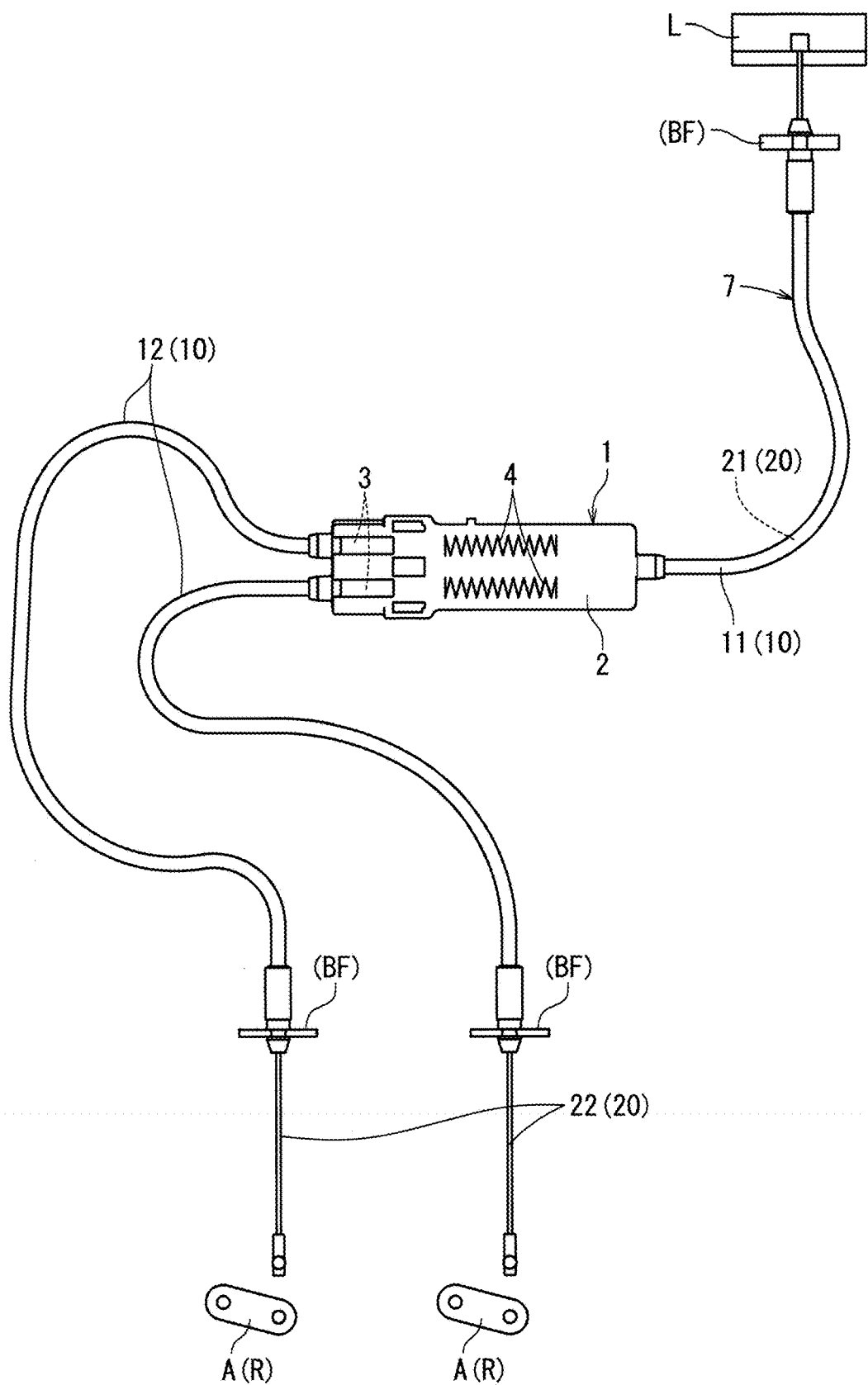
FIG. 5 is a schematic diagram illustrating a state of an inner cable before each post-branch inner cable is connected to an object.
Figure 6:
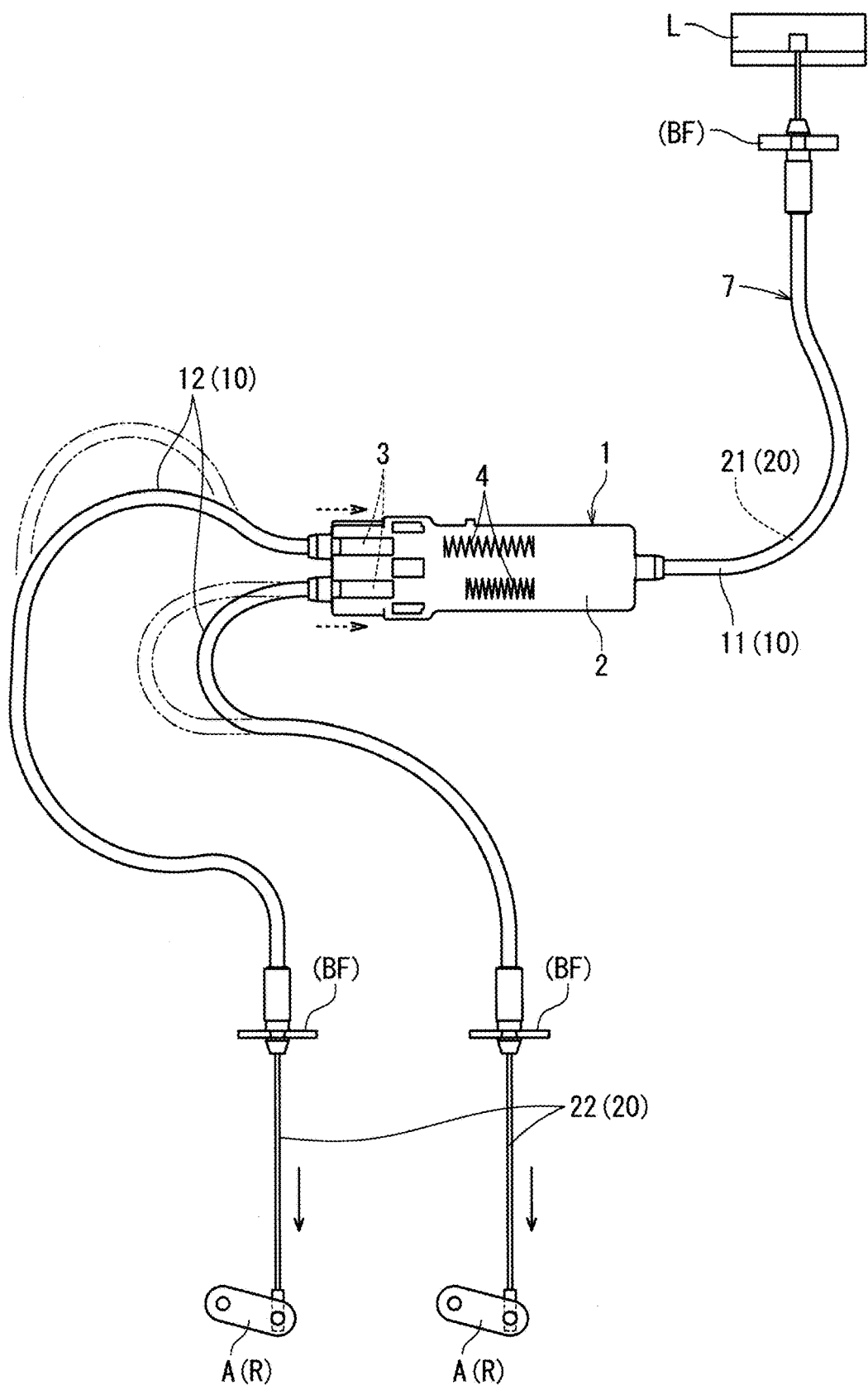
FIG. 6 is a schematic diagram illustrating a state of the inner cable after each post-branch inner cable is pulled out and connected to the object.

Referring to FIGS. 5 and 6, the method of routing the operation cable 7 using the cable adjuster 1 will be described. As shown in FIG. 5, the operation cable 7 is routed to the back frame BF with the cable adjuster 1 assembled in the middle of the routing path.

First, the end of the operation-side (upper side of FIGS. 5 and 6) of the pre-branch outer casing 11 and the ends of the operated-side (lower side of FIGS. 5 and 6) of each post-branch outer casing 12, are fixed to the back frame BF, respectively. The end of the operation-side of the pre-branch inner cable 21 is fixed to the operation lever L. Therefore, only the ends of the operated-side of each post-branch inner cable 22 are in a state where they are not connected to the connection target (release arm A).

The length of each post-branch inner cable 22 pulled out from the corresponding post-branch outer casing 12 to the operated-side is set to a length that does not reach the corresponding release arm A to which they are connected. The reason is that if the length of each post-branch inner cable 22 reaches the corresponding release arm A at this state, the variation in length will cause play due to the excess length.

Next, as shown in FIG. 6, the end of the operated-side of each post-branch inner cable 22 is pulled out to a position where it reaches the corresponding release arm A and fixed thereto. Therefore, each post-branch outer casing 12 is pushed into the cable adjuster 1 by the length corresponding to the length of the corresponding post-branch inner cable 22 pulled out (see dashed arrow in FIG. 6).

The reason why each post-branch outer casing 12 is pushed into the cable adjuster 1 as described above is as follows. The end of the operation-side (upper side of FIGS. 5 and 6) of the pre-branch outer casing 11 is fixed to the back frame BF, the ends of the operated-side (lower side of FIGS. 5 and 6) of each post-branch outer casing 12 are fixed to the back frame BF, the end of the operation-side of the pre-branch inner cable 21 is fixed to the operation lever L. In this state, the end of the operated-side of each post-branch inner cable 22 is pulled out from the end of the operated-side of the corresponding post-branch outer casing 12.

The total length of the pre-branch inner cable 21 and one of the post-branch inner cables 22 does not change. The total length of the pre-branch inner cable 21 and the other post-branch inner cable 22 also does not change. The length of the pre-branch inner cable 21 pulled out from the end of the operation-side of the pre-branch outer casing 11 also does not change. In such a state, each post-branch inner cable 22 is pulled out from the end of the operated-side of the corresponding post-branch outer casing 12. Then, as the post-branch inner cable 22 is pulled out, each post-branch outer casing 12 is pushed into the cable adjuster 1 against the spring force, respectively (see dashed arrow in FIG. 6).

Figure 7:
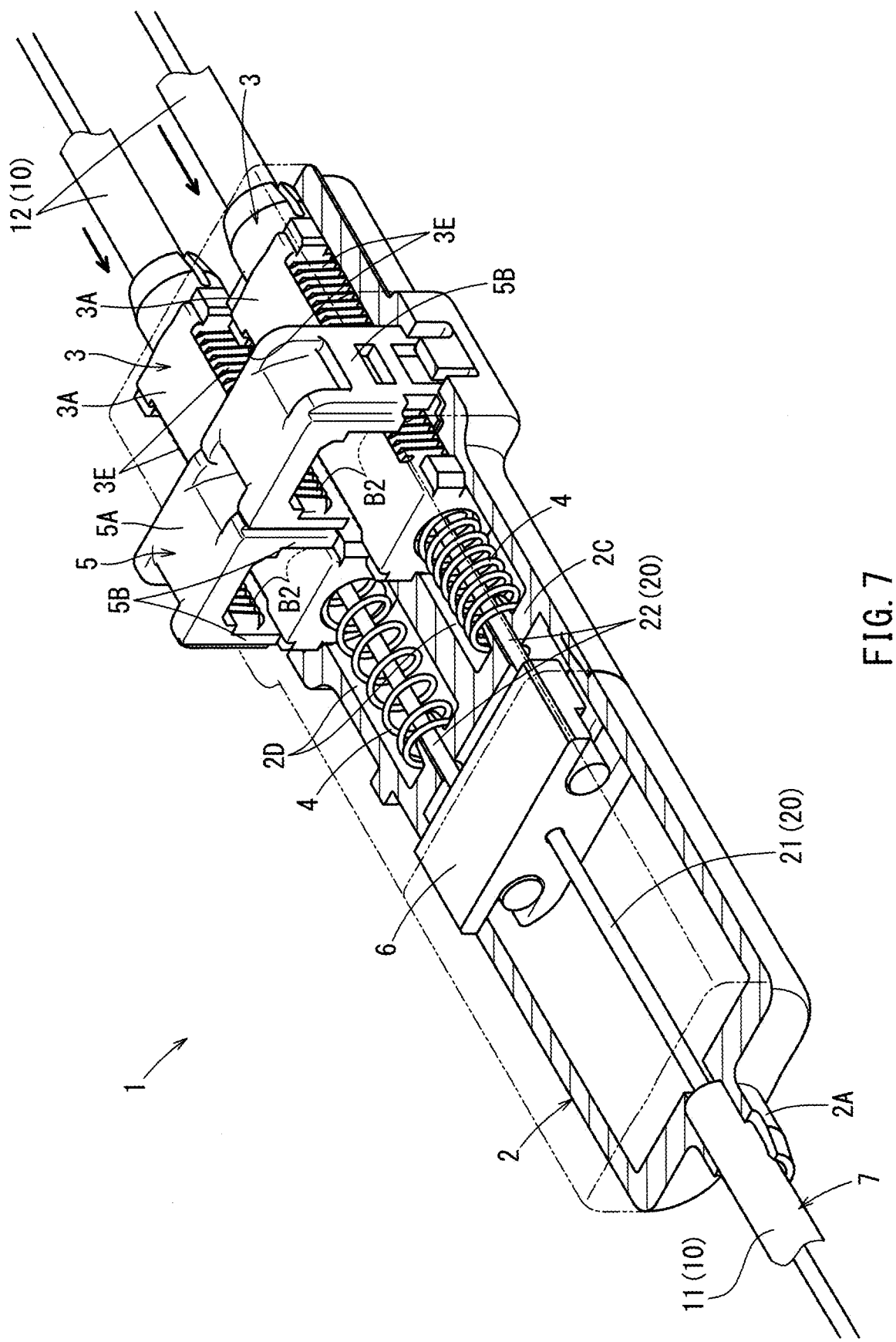
FIG. 7 is a perspective view of a partial cross-sectional view of the cable adjuster corresponding to the state of FIG. 6.

Specifically, as shown in FIG. 7, the corresponding slider 3, to which the connecting end of each post-branch outer casing 12 is fixed, is pushed into the main case 2 against the spring force of each compression coil spring 4. The length of pushing-in (sliding) of each slider 3 into the main case 2 is determined individually according to the length of each post-branch inner cable 22 pulled out. Therefore, the length of push-in of each slider 3 may be different from each other or may be the same.

As the slider 3 slides against the spring force, the end of the operated-side of each post-branch inner cable 22 shown in FIG. 6 is connected to the corresponding release arm A with the excess length shorten. Then, as shown in FIG. 8, after the sliders 3 slides with respect to the main case 2, the locking member 5 attaches to the main case 2 and locks the individual sliding movement of each slider 3. The length of each post-branch outer casing 12 extending out from the main case 2 (guide length) affixes in an individually and appropriately adjusted state.

To summarize the above, the cable adjuster 1 according to the present embodiment has the following configuration. Note that in the following description, the reference numbers in parentheses correspond to the respective configurations shown in the above embodiment.

A cable adjuster (1) of the present disclosure is an adjuster which adjusts the length of a tubular outer casing (10) into which an inner cable (20) is inserted. The cable adjuster (1) has a main case (2) configured to insert the inner cable (20) in the cable axial direction, and an outer casing fixing member (2A) which fixes an end of a pre-branch outer casing (11) to the main case (2). The pre-branch outer casing (11) is a tubular section of the outer casing (10) before branching.

The cable adjuster (1) has a plurality of sliders (3). The sliders (3) are arranged in parallel in a slot (2D) formed in the main case (2) so as to slide in the cable axial direction. The sliders (3) fix the ends of a plurality of post-branch outer casings (12), which are the post-branch tube sections of the outer casing (10), respectively. The cable adjuster (1) also has a locking member (5). The locking member (5) locks the sliding movement of the plurality of sliders (3) with respect to the main case (2) in the cable axial direction. According to the above configuration, even if the outer casing (10) is branched into a plurality of casings, the guide length of each post-branch outer casing (12) can be individually adjusted to an appropriate length by a single cable adjuster (1).

The locking member (5) engages the plurality of sliders (3) to collectively lock the sliding movement of the plurality of sliders (3). Accordingly, a plurality of sliders (3) can be conveniently locked together in their respective adjusted positions with respect to the main case (2).

The main case (2) comprises two split pieces (P1, P2) which is configured to fit in the cable axial direction at the middle between the outer casing fixing portion (2A) and the slot (2D). According to the above configuration, the end of the inner cable (20) which are passed through the pre-branch outer casing (11) and the ends of the inner cable (20) which are passed through the post-branch outer casings (12) can be easily connected to each other in the open space between the two split pieces (P1, P2) of the main case (2). This makes it possible to easily connect the ends of the inner cable (20) to each other even after assembling a plurality of sliders (3) into the slots (2D) of the main case (2).

The cable adjuster (1) further has an inner cable connecting member (6) arranged in the middle of the main case (2). The inner cable connecting member (6) connects an end of the pre-branch inner cable (21) and an end of a plurality of post-branch inner cables (22). The pre-branch inner cable (21) is a pre-branch cable section of the inner cable (20) pulled out from the end of the pre-branch outer casing (11). The post-branch inner cable (22) is a post-branch cable section of the inner cable (20) pulled out from the end of the post-branch outer casing (12). According to the above configuration, the inner cable connecting member (6) allows the ends of the inner cable (20) to be connected to each other more easily.

Although an embodiment of the present disclosure has been described above, the present disclosure can be embodied in various forms in addition to the above embodiment.

1. According to the cable adjuster of the present disclosure, the main case may be either fixed to the back frame (the structure in which the cable is routed) or not. The cable adjuster may be configured without the spring member that biases each slider against the main case in the cable axial direction. Even without the spring member, the user can individually and appropriately adjust the guide length of each post-branch outer casing by sliding the corresponding slider to a position that shorten the length of post-branch inner cable pulled out according to the length of post-branch inner cable is pulled out.

2. The direction in which each slider is inserted into the main case (the direction of assembly) may be the cable radial direction as well as the cable axial direction. The structure for preventing each slider from coming off the main case in the cable axial direction before the locking member is locked may be a structure in which each slider is abutted against the main case to be locked other than the structure in which each slider is abutted against the locking member to be locked.

3. The locking member may be configured to lock to each slider by rotating in the cable axial direction or around an axis extending in the cable radial direction other than by sliding in the cable radial direction relative to the main case. A plurality of locking members may be provided so as to individually lock the sliding of each slider. The locking member may lock to each slider by recess-projection fitting or frictional resistance other than by engaging.

4. The post-branch outer casing may be branched into three or more branches. The pre-branch inner cable and each post-branch inner cable may be directly connected to each other without an inner cable connecting member. The operation cable may be composed of the outer casing and inner cable separately without being unitized, other than unitized as a pull cable with the inner cable threaded inside the outer casing. In such a case, after assembling the pre-branch outer casing and each post-branch outer casing into the cable adjuster, the pre-branch inner cable and each post-branch inner cable of the inner cable may be passed through the pre-branch outer casing and each post-branch outer casing, then connected them inside the cable adjuster.

According to one aspect of the present disclosure, a cable adjuster which adjusts the length of a tubular outer casing into which an inner cable is inserted. The cable adjuster has a main case, an outer casing fixing member, a plurality of sliders, and a locking member. The main case is configured to insert the inner cable in the cable axial direction. The outer casing fixing member fixes an end of a pre-branch outer casing, which is the tube section of the outer casing before branching, to the main case. The sliders are arranged in parallel in the slots formed in the main case so as to slide in the cable axial direction. The sliders fix the ends of a plurality of post-branch outer casings, which are the post-branch tube sections of the outer casing. The locking member locks the sliding movement of the sliders with respect to the main case in the cable axial direction.

Therefore, even if the outer casing is branched into a plurality of casings, the guide length of each post-branch outer casing can be individually adjusted to an appropriate length by a single cable adjuster.

According to another aspect of the present disclosure, the locking member is engaged with the plurality of sliders to collectively lock the sliding movement of the plurality of sliders.

Therefore, a plurality of sliders can be conveniently locked together in their respective adjusted positions with respect to the main case.

According to another aspect of the present disclosure, the main case comprises two split pieces so that they can fit in the cable axial direction at the middle between the outer casing fixing portion and the slot.

Therefore, the end of the inner cable which are passed through the pre-branch outer casing and the ends of the inner cable which are passed through the post-branch outer casings can be easily connected to each other in the open space between the two split pieces of the main case. This makes it possible to easily connect the ends of the inner cable to each other even after assembling a plurality of sliders into the slots of the main case.

According to another aspect of the present disclosure, the cable adjuster further has an inner cable connecting member arranged in the middle of the main case. The inner cable connecting member connects an end of the pre-branch inner cable and an end of a plurality of post-branch inner cables.

The pre-branch inner cable is a pre-branch cable section of the inner cable pulled out from the end of the pre-branch outer casing. The post-branch inner cable is a post-branch cable section of the inner cable pulled out from the end of the post-branch outer casing.

Therefore, the inner cable connecting member allows the ends of the inner cable to be connected to each other more easily.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved cable adjuster, and/or methods of making and using the same.

We claim:

1. A cable adjuster for adjusting a length of an outer casing into which an inner cable is inserted, comprising:
   a main case configured to retain the inner cable inserted into the main case in a cable axial direction;
   an outer casing fixing member configured to fasten an end of a pre-branch outer casing to the main case, wherein the pre-branch outer casing is a tube section of the outer casing before branching;
   a plurality of sliders arranged in parallel in a plurality of slots formed in the main case, so that the plurality of sliders slide in the cable axial direction and are fastened to ends of a plurality of post-branch outer casings; and
   a locking member configured to lock the sliding movement of the sliders with respect to the main case in the cable axial direction.

2. The cable adjuster according to claim 1, wherein the locking member is configured to engage the plurality of sliders to collectively lock the sliding movement of the plurality of sliders.

3. The cable adjuster according to claim 1, wherein the main case further comprises
   a plurality of split pieces, configured to fit in the cable axial direction at the middle between the outer casing fixing member and the plurality of slots.

4. The cable adjuster according to claim 3, wherein the plurality of split pieces are two split pieces.

5. The cable adjuster according to claim 1, wherein the cable adjuster further comprises
   an inner cable connecting member, wherein the inner cable connecting member is arranged in the middle portion of the main case and configured to connect to an end of a pre-branch inner cable, which is a pre-branch cable section of the inner cable pulled out from the end of the pre-branch outer casing, and ends of a plurality of post-branch inner cables, which is a post-branch cable section of the inner cable pulled out from the ends of the plurality of post-branch outer casings that are fastened to the plurality of sliders.

6. A cable adjuster for adjusting a length of an outer casing into which an inner cable is inserted, comprising:
   an operation cable configured to be routed to a seat back of an automobile seat, the operation cable including the inner cable and the outer casing;
   a main case configured to retain the inner cable inserted into the main case in a cable axial direction;
   an outer casing fixing member configured to fasten an end of a pre-branch outer casing to the main case, wherein the pre-branch outer casing is a tube section of the outer casing before branching;
   a plurality of sliders arranged in parallel in a plurality slots formed in the main case, so that the plurality of sliders slide in the cable axial direction and are fastened to ends of a plurality of post-branch outer casings, respectively; and
   a locking member configured to lock the sliding movement of the sliders with respect to the main case in the cable axial direction.

7. The cable adjuster of claim 6, wherein the outer casing is configured to function as a tubular cable guide.

8. The cable adjuster of claim 7, wherein the outer casing comprises the one pre-branch outer casing and the plurality of post-branch outer casings, and wherein the pre-branch outer casing is configured to connect to the plurality of post-branch outer casings via the cable adjuster.

9. The cable adjuster of claim 6, wherein the inner cable is configured to pass inside the outer casing.

10. The cable adjuster of claim 6, wherein the main case further comprises two split pieces being divided in the cable axial direction, and wherein the two split pieces are cylindrically shaped.

11. The cable adjuster of claim 10, wherein the two split pieces are configured to be integrated with each other in the cable axial direction to assemble the main case into a flat cylindrical shape.

12. The cable adjuster of claim 6, wherein the main case further comprises a top plate extending flatly in the cable axis direction and a horizontal direction.

13. The cable adjuster of claim 12, wherein the top plate further comprises a plurality of rectangular hole-shaped inlet ports.

14. The cable adjuster of claim 13, wherein the plurality of rectangular hole-shaped inlet ports are three rectangular hole-shaped inlet ports.

15. The cable adjuster of claim 13, wherein the locking member further comprises a plurality of leg portions, and wherein the plurality of leg portions are configured to insert into the plurality of rectangular hole-shaped inlet ports.

16. The cable adjuster of claim 15, wherein the plurality of leg portions are three leg portions.

* * * * *